US010466432B2

(12) United States Patent
Luo et al.

(10) Patent No.: US 10,466,432 B2
(45) Date of Patent: Nov. 5, 2019

(54) HIGH SPEED OPTICAL TRANSCEIVER MODULE

(71) Applicant: Global Technology Inc., Ningbo, Zhejiang Province (CN)

(72) Inventors: Jian-Hong Luo, Ningbo (CN); Chao-Hung Tsai, Ningbo (CN); Che-Shou Yeh, Ningbo (CN); Jang-Hung Tian, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 15/971,621

(22) Filed: May 4, 2018

(65) Prior Publication Data

US 2019/0018206 A1    Jan. 17, 2019

(30) Foreign Application Priority Data

Jul. 13, 2017    (CN) ..................... 2017 2 0846636 U

(51) Int. Cl.
*G02B 6/42* (2006.01)
*H04B 10/40* (2013.01)
*G02B 6/43* (2006.01)

(52) U.S. Cl.
CPC .............. *G02B 6/425* (2013.01); *G02B 6/43* (2013.01); *H04B 10/40* (2013.01); *G02B 6/428* (2013.01)

(58) Field of Classification Search
CPC .......... G02B 6/425; G02B 6/428; G02B 6/43; H04B 10/40
See application file for complete search history.

(56) References Cited

U.S. PATENT DOCUMENTS

| 5,617,234 A | 4/1997 | Koga et al. |
| 6,305,848 B1 * | 10/2001 | Gregory ............... G02B 6/4246 385/134 |
| 7,058,263 B2 | 6/2006 | Welch et al. |
(Continued)

FOREIGN PATENT DOCUMENTS

CN    203414640 U  *  1/2014  ............... G02B 6/42

OTHER PUBLICATIONS

PCT Search Report and Written Opinion dated Jul. 6, 2017, received in corresponding PCT Application No. PCT/US17/29350, 9 pgs.
(Continued)

*Primary Examiner* — Daniel Petkovsek
(74) *Attorney, Agent, or Firm* — Grossman Tucker Perreault & Pfleger, PLLC

(57) ABSTRACT

The present disclosure discloses a high speed optical module having a PCBA component and a passive optical element. The PCBA component includes a receiver and a transmitter. The transmitter includes an amplifier chip and a photodiode array connected to pins of the amplifier chip. The transmitter includes a laser driving chip and a base. Multiple lasers are arranged side by side in the base. The lasers are connected to the laser driving chip. A plurality of fiber interfaces are arranged on output light paths corresponding to the plurality of lasers. The passive optical element includes ferrules corresponding to the plurality of fiber interfaces, and the ferrules are correspondingly inserted into the plurality of fiber interfaces in a one-to-one relationship. The passive optical element is inserted into the PCBA component by fiber interfaces arranged on the PCBA component.

7 Claims, 6 Drawing Sheets

(56) References Cited

U.S. PATENT DOCUMENTS

| | | | |
|---|---|---|---|
| 7,162,124 B1 | 1/2007 | Gunn, III et al. | |
| 7,329,054 B1* | 2/2008 | Epitaux | G02B 6/4249 |
| | | | 385/89 |
| 7,376,308 B2 | 5/2008 | Cheben et al. | |
| 7,532,783 B2 | 5/2009 | Bai | |
| 7,941,053 B2 | 5/2011 | Dallesasse | |
| 8,831,433 B2 | 9/2014 | Ho et al. | |
| 9,341,786 B1 | 5/2016 | Gamache | |
| 9,419,717 B2* | 8/2016 | Huang | G01J 1/0271 |
| 9,476,763 B2 | 10/2016 | Kachru et al. | |
| 9,482,819 B2* | 11/2016 | Li | G02B 6/29365 |
| 9,553,671 B1* | 1/2017 | Nagarajan | H04B 10/40 |
| 9,557,500 B1 | 1/2017 | Luo et al. | |
| 9,614,620 B2* | 4/2017 | Ho | G02B 6/43 |
| 10,088,639 B2* | 10/2018 | Mentovich | G02B 6/4243 |
| 2003/0174964 A1 | 9/2003 | Gao et al. | |
| 2004/0161186 A1 | 8/2004 | Crafts et al. | |
| 2012/0301152 A1* | 11/2012 | Edwards | G02B 6/4201 |
| | | | 398/135 |
| 2015/0249501 A1 | 9/2015 | Nagarajan | |
| 2015/0256259 A1 | 9/2015 | Huang | |
| 2015/0316732 A1* | 11/2015 | Schamuhn | G02B 6/4284 |
| | | | 398/139 |
| 2016/0131854 A1* | 5/2016 | de Jong | G02B 6/3879 |
| | | | 385/59 |
| 2016/0149662 A1 | 5/2016 | Soldano et al. | |
| 2016/0349451 A1 | 12/2016 | Shen et al. | |
| 2017/0168252 A1 | 6/2017 | Pezeshki et al. | |
| 2017/0187462 A1* | 6/2017 | Luo | G02B 6/4206 |
| 2017/0248763 A1* | 8/2017 | Kawamura | G02B 6/421 |
| 2017/0307819 A1 | 10/2017 | Ho et al. | |
| 2017/0336582 A1 | 11/2017 | Luo et al. | |
| 2019/0018206 A1 | 1/2019 | Luo | |

OTHER PUBLICATIONS

U.S. Office Action dated Aug. 21, 2017, received in U.S. Appl. No. 15/137,823, 13 pgs.
U.S. Office Action dated Aug. 29, 2017, received in U.S. Appl. No. 15/432,242, 15 pgs.
U.S. Office Action dated Apr. 13, 2018, received in U.S. Appl. No. 15/432,242, 28 pgs.
U.S. Office Action dated Jan. 28, 2019, received in related U.S. Appl. No. 15/432,242, 10 pgs.
U.S. Office Action dated Apr. 16, 2019, received in related U.S. Appl. No. 16/142,466, 23 pgs.

* cited by examiner

HIGH SPEED OPTICAL TRANSCEIVER MODULE

TECHNICAL FIELD

The present disclosure relates to the field of optical communication, and more particularly, to a high speed optical transceiver module.

BACKGROUND

High speed optical transceiver modules are primarily used in fields of optical communication such as data centers and Fiber to the Home (FTTH), and they are core communication modules in optical communication. Due to growing demands on transmission bandwidth and speed by upgraded communication systems, the configurations of optical transceiver modules are being developed to be with advantages of smaller in volume, better in integration and operating with multiple channels. The demands are also growing on cost-control and process-control. An existing high speed optical transceiver includes a printed circuit board assembly (PCBA) component and an optical engine which is usually directly soldered to the PCBA component. This design is not reliable when there is something wrong with soldered connection, which may result in inferiority of signal transmission in the high speed optical transceiver. Further, since such a design requires soldering the PCBA component to the optical engine, which just complicates the manufacture process, the yield rate remains a lot to be desired. Meanwhile, the corresponding complicated manufacturing process therefore includes handling the PCBA component first before soldering the optical engine to the PCBA component and mounting a protecting lid above the soldered position using screws.

SUMMARY

The present disclosure provides a high speed optical transceiver module including a PCBA component and a passive optical element.

The PCBA component includes a receiver and a transmitter. The receiver may include an amplifier chip and a photodiode array connected to pins of the amplifier chip. The transmitter may include a laser driving chip and a base. The base may include a plurality of lasers arranged side by side therein. The lasers are connected to the laser driving chip. A plurality of fiber interfaces are arranged on output light paths corresponding to the lasers. The passive optical element may include ferrules corresponding to the fiber interfaces, and the ferrules are correspondingly inserted into the fiber interfaces in a one-to-one relationship.

The present disclosure has the following advantages compared to prior arts.

The passive optical element is inserted into the PCBA component by the fiber interfaces arranged on the PCBA component. The connection approach is convenient, effective, and stable without resorting to soldering. Also, the PCBA component and the passive optical element can be manufactured separately, and assembled later. Modular production of the PCBA component and the passive optical element therefore can be achieved for the production of the disclosed optical transceiver module. Various types of products can be manufactured according to the type of the passive optical element. Therefore, the PCBA component can be used for general purposes. The functionalities of the high speed optical transceiver module could be more flexible to satisfy numerous needs. The production efficiency and the product yield are also enhanced consequently. In some embodiments, 4 lasers and 4 fiber interfaces could be found in the transceiver module. In some embodiments, the passive optical element is a multi push on (MPO) connector. The MPO connector may include a first plurality of ferrules and a first fiber array on one end and a mechanical transfer (MT) pin on the other end. The first ferrules are correspondingly connected to the fiber interfaces in a one-to-one relationship. An end of the first fiber array is mounted over or in the proximity of the photodiode array. The MT pin is used to connect other photoelectric devices. In some embodiments, the passive optical element is a MPO connector having a tail fiber. The MPO connector with the tail fiber may include a tail sleeve. The tail sleeve may include a second plurality of ferrules and a second fiber array on one end and the tail fiber on the other end. The second ferrules are correspondingly connected to the fiber interfaces in a one-to-one relationship. An end of the second fiber array is mounted over or in proximity of the photodiode array, and the tail fiber may include an optical connector on an end. The optical connector can be configured to allow for general-purpose usage of the MPO connector with the tail fiber.

In some embodiments, the optical connector is one of an arrayed connector, a lucent connector (LC), and a subscriber connector (SC).

In some embodiments, each of the first and second fiber arrays is a fiber array having an angle of 41 to 45 degrees. The light emitted from the fiber array would be incident on the photodiode array vertically to provide the shortest light path.

In some embodiments, the passive optical element is a wavelength division multiplexer including a multiplexing component and a de-multiplexing component. The multiplexing component comprises a third plurality of ferrules connected to the plurality of fiber interfaces in one-to-one correspondence. The demultiplexing component comprises an arrayed waveguide grating (AWG) chip, and an end of the AWG chip is mounted on the photodiode array. Wavelength division multiplexing can be achieved by the multiplexing component and the demultiplexing component. In some embodiments, an end face of the AWG chip is a slope having a slope angle of 41 to 45 degrees so that light may enter the photodiode array vertically.

REFERENCE NUMBERS

Figure 1:
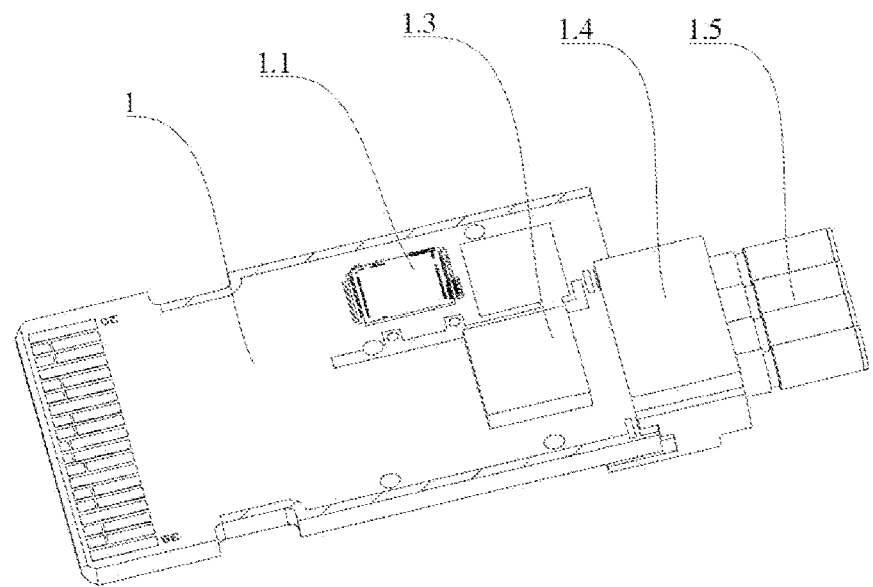
FIG. 1 is a structural schematic of a PCBA component.

1 PCBA component, 1.1 amplifier chip, 1.2 photodiode array, 1.3 laser driving chip, 1.4 base, 1.5 fiber interface, 2 MPO connector, 2.1 first plurality of ferrules, 2.2 first fiber array, 2.2.1 end face of first fiber array, 2.3 MT pin, 3 MPO connector with a tail fiber, 3.1 second plurality of ferrules, 3.2 second fiber array, 3.3 tail sleeve, 3.4 tail fiber, 3.5 optical connector, 4 multiplexing component, 4.1 third plurality of ferrules, 5 de-multiplexing component, 5.1 AWG chip.

DETAILED DESCRIPTION

A high speed optical transceiver module may include a PCBA component 1 and a passive optical element. The PCBA component 1 may include a receiver and a transmitter. The receiver comprises an amplifier chip 1.1 and a photodiode array 1.2. The photodiode array 1.2 is connected to pins of the amplifier chip 1.1. The transmitter may include a laser driving chip 1.3 and a base 1.4. The base 1.4 may include a plurality of lasers arranged side by side. The lasers are connected to the laser driving chip 1.3. A plurality of fiber interfaces 1.5 are arranged on output light paths corresponding to the lasers. The passive optical element may include ferrules corresponding to the fiber interfaces 1.5. The ferrules are correspondingly inserted into the fiber interfaces in another one-to-one relationship. Light emitted by the lasers is transmitted into the passive optical element through the ferrules of the passive optical element.

Figure 2:
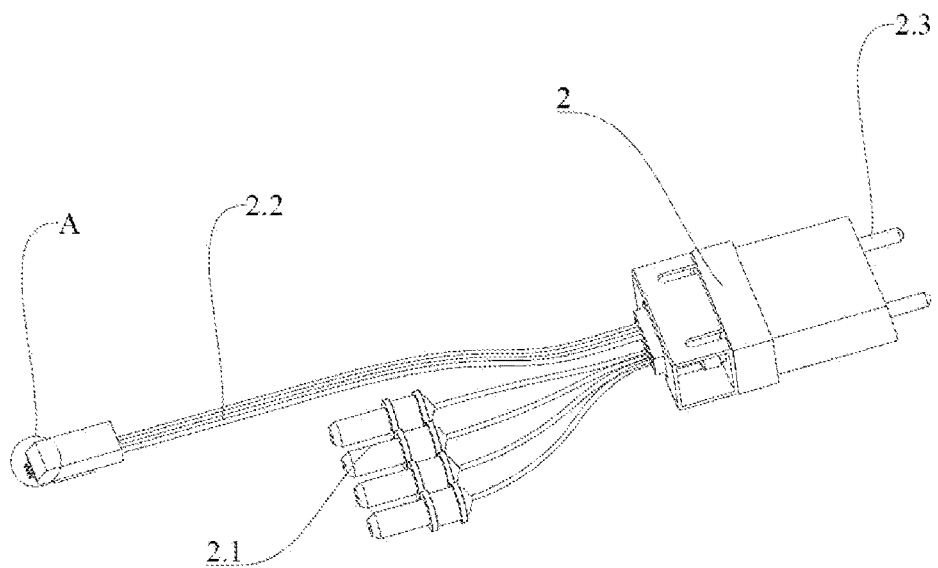
FIG. 2 is a structural schematic of a MPO connector.
Figure 3:
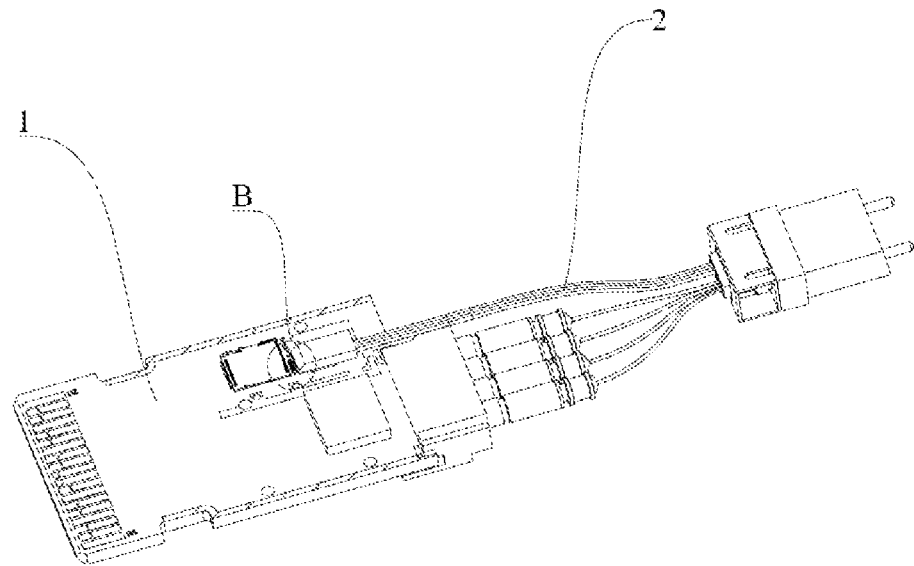
FIG. 3 is a structural schematic of a PSM4 module.
Figure 4:
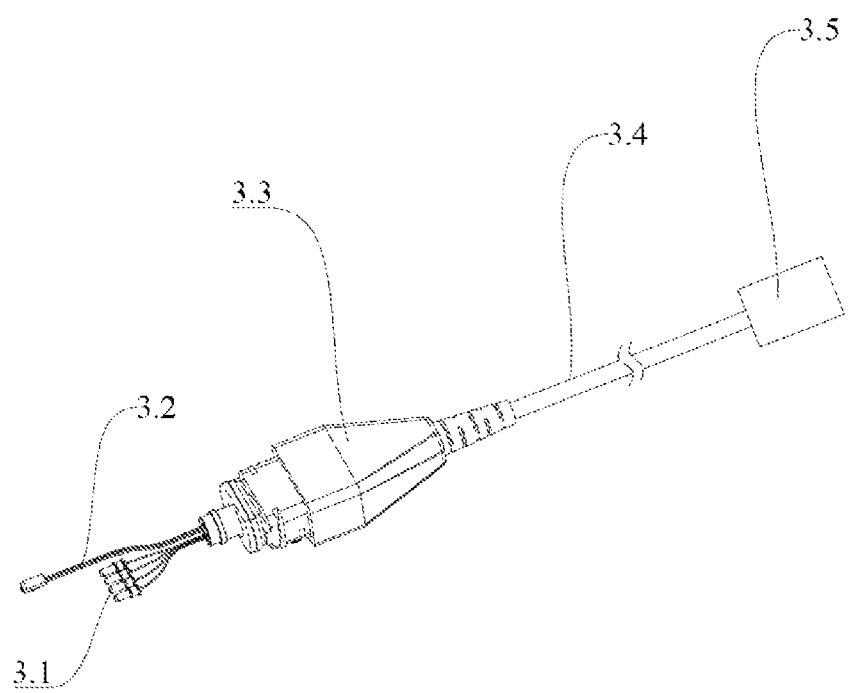
FIG. 4 is a MPO connector with a tail fiber.
Figure 5:
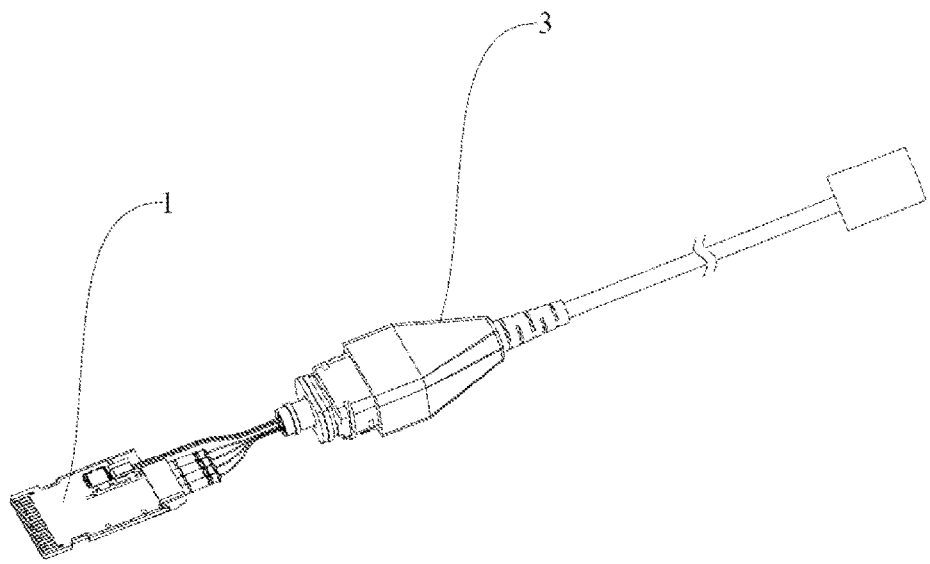
FIG. 5 is a structural schematic of a PSM4 module with a tail fiber.
Figure 9:
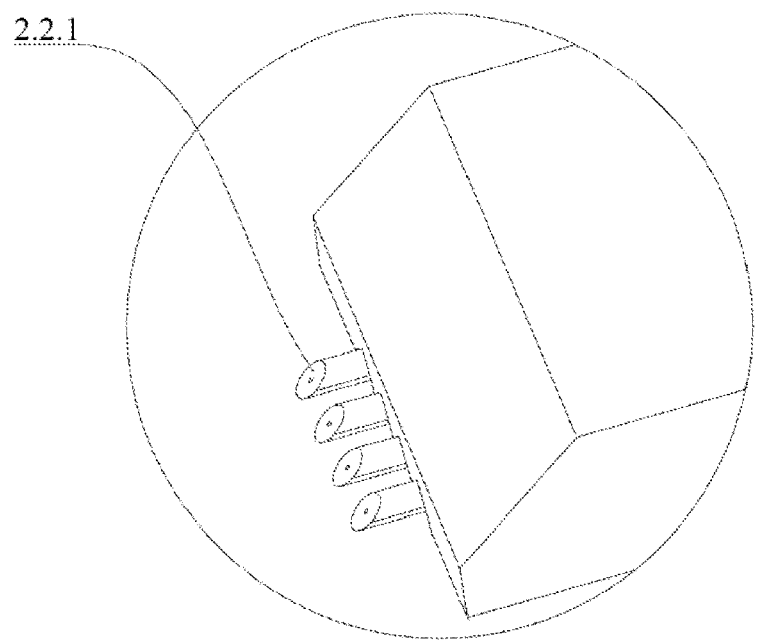
FIG. 9 is an enlarged view of the part A.
Figure 10:
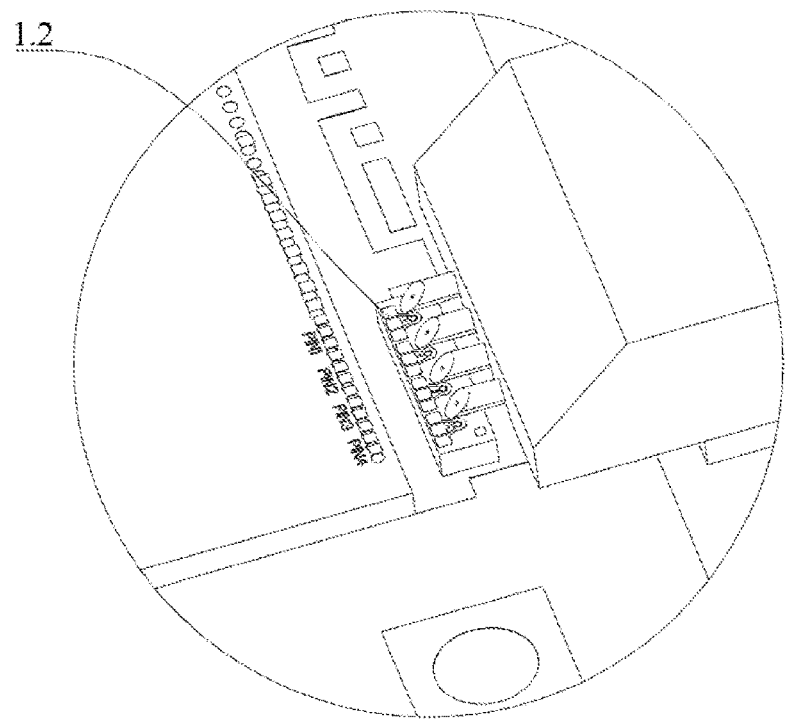
FIG. 10 is an enlarged view of the part B.

As shown in FIG. 1 to FIG. 5 and FIG. 9 to FIG. 10, a parallel single-mode four-channel module, i.e., the PSM4 module has two types of structures. A PSM4 module of the first type may include a PCBA component 1 and a MPO connector 2. The PCBA component 1 may include four lasers and four fiber interfaces. The MPO connector 2 may include a first plurality of ferrules 2.1 and a first fiber array 2.2 on one of its ends and a mechanical transfer (MT) pin 2.3 on the other end thereof. The first plurality of ferrules 2.1 are correspondingly connected to the fiber interfaces 1.5 in a one-to-one relationship. An end of the first fiber array 2.2 is disposed over the photodiode array 1.2. The MT pin is a plug-in interface used to connect other photoelectric devices. Light emitted by the lasers enters the MPO connector 2 through the first plurality of ferrules 2.1. After conversion, the light is transmitted from the end of the first fiber array 2.2 to the photodiode array 1.2. The second type is a PSM4 module with a tail fiber. The PSM4 module in this embodiment may include a PCBA component 1 and a MPO connector with a tail fiber 3.4. The MPO connector with the tail fiber 3.4 may include a tail sleeve 3.3. The tail sleeve 3.3 may include a second plurality of ferrules 3.1 and a second fiber array 3.2 on one end with the tail fiber 3.4 on the other end. The second ferrules 3.1 are correspondingly connected to the fiber interfaces 1.5 in another one-to-one relationship. An end of the second fiber array 3.2 is mounted over or in proximity of the photodiode array 1.2. A protecting lid is arranged at a predetermined position where the second fiber array 3.2 is disposed over or in proximity of the photodiode array 1.2. The protecting lid is used to limit the end part of the second fiber array 3.2. An optical connector 3.5 is arranged on an end part of the tail fiber 3.4. The optical connector 3.5 could be chosen to meet different needs. For example, the optical connectors 3.5 could be MPO connectors, lucent connectors (LC), or subscriber connectors (SC). Both the first fiber array 2.2 and the second fiber array 3.2 are arrayed fibers having angles of 41 to 45 degrees. The light emitted from the first fiber array 2.2 or the second fiber array 3.2 would be incident on the photodiode array 1.2 vertically to provide the shortest light path, which might maintain the quality of the transmission signal.

Figure 6:
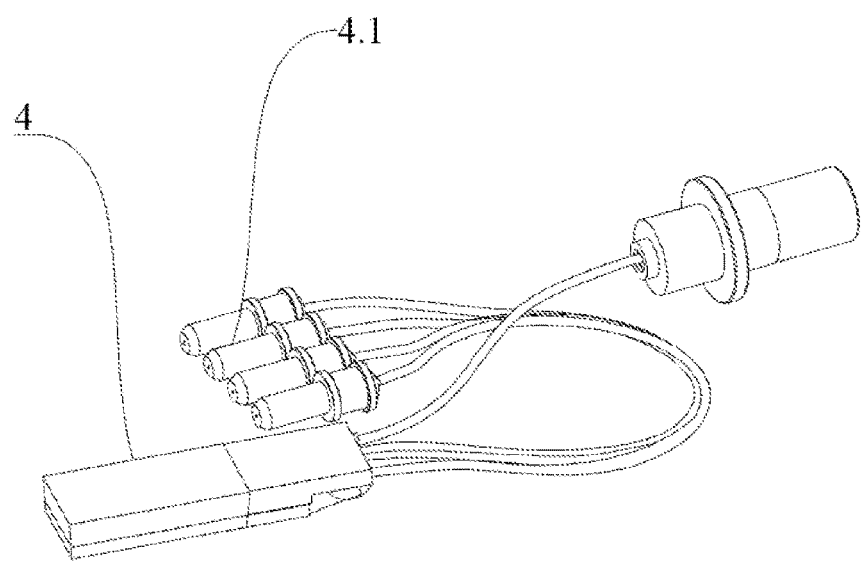
FIG. 6 is a structural schematic of a multiplexing component.
Figure 7:
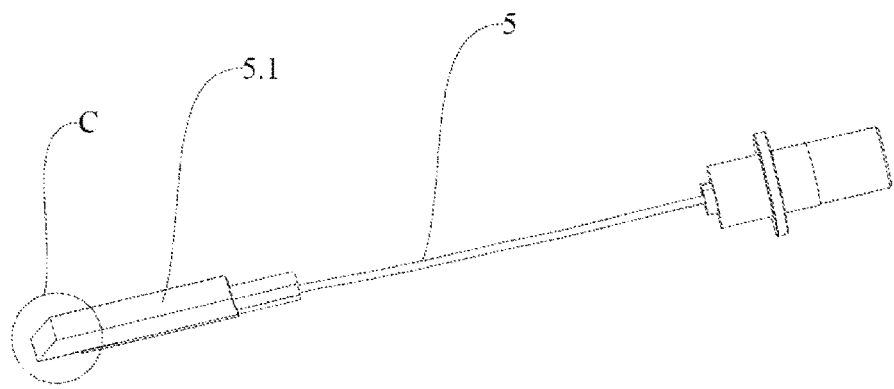
FIG. 7 is a structural schematic of a demultiplexing component.
Figure 8:
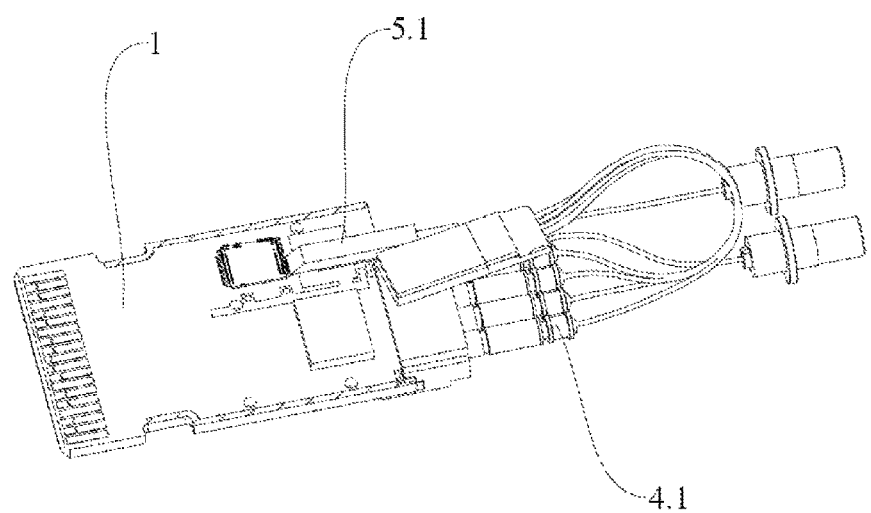
FIG. 8 is a structural schematic of a CWDM4 module.
Figure 11:
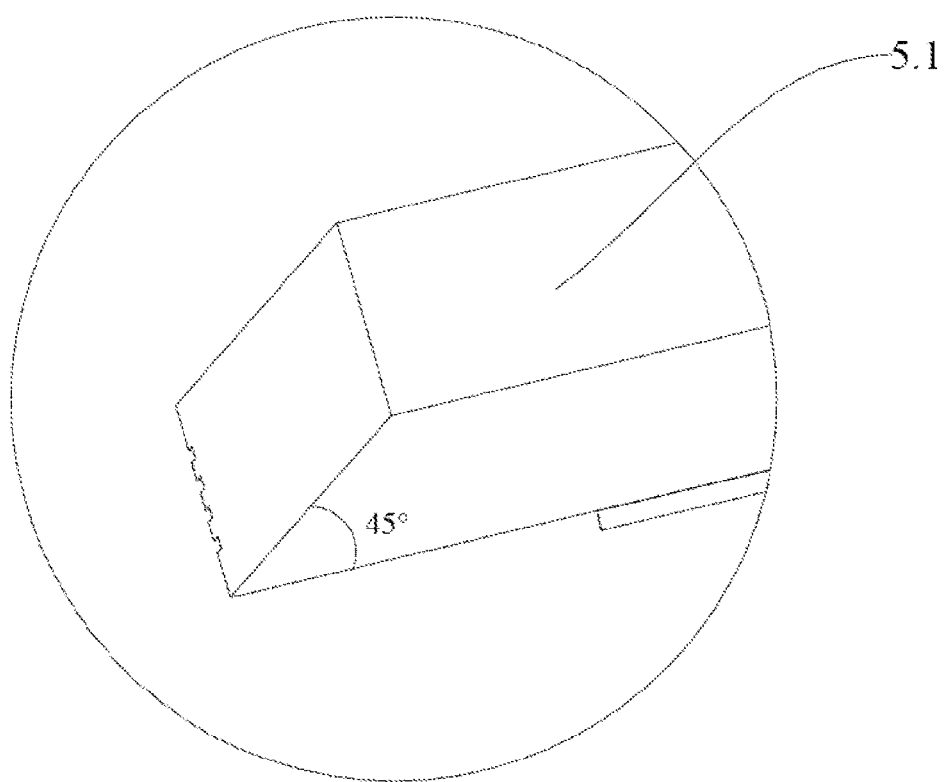
FIG. 11 is an enlarged view of the part C.

As shown in FIGS. 6-8 and 11, an optical transceiver module enabling wavelength multiplexing such as a CWDM4 module including a PCBA component 1 and a wavelength division multiplexer is disclosed. The wavelength division multiplexer may include a MUX component 4 and a DEMUX component 5. Four lasers and four fiber interfaces are arranged on the PCBA component 1. The multiplexing component 4 may include a third plurality of ferrules 4.1. The third plurality of ferrules 4.1 are connected to the fiber interfaces 1.5 on a one-to-one basis. The demultiplexing component 5 may include an arrayed waveguide grating (AWG) chip 5.1. An end of the AWG chip 5.1 is mounted on the light receiving surface of the photodiode array 1.2. The end face of the AWG chip 5.1 is oriented between 41 to 45 degrees so that the light path would be rotated by 90° before it is incident on the receiving surface of the photodiode array 1.2. The angle of the end face of the AWG chip 5.1 can be adjusted according to different reflected volumes and required receiving responsiveness.

The PCBA component and the passive optical element of the present disclosure may be manufactured in modules separately before they are assembled together. High speed optical transceivers with various functionalities can be manufactured by combining various passive optical elements with the PCBA component. More functions may become available in the high speed optical transceiver. Modular production would also increase production efficiency and product yield.

What is claimed is:
1. A high-speed optical transceiver module, comprising:
   a printed circuit board assembly (PCBA) component having a receiver and a transmitter; and
   a passive optical element, wherein
      the receiver comprises an amplifier chip and a photodiode array connected to pins of the amplifier chip;
      the transmitter comprises a laser driving chip and a base;
      the base comprises a plurality of lasers arranged side by side;
      the plurality of lasers are connected to the laser driving chip;
      a plurality of fiber interfaces are arranged on output light paths corresponding to the lasers;
      the passive optical element comprises ferrules corresponding to the fiber interfaces and a fiber array for emitting light on the photodiode array of the receiver; and
      the ferrules are inserted into the plurality of fiber interfaces in one-to-one correspondence.
2. The high-speed optical transceiver module of claim 1, wherein the plurality of lasers comprise 4 lasers, and the plurality of fiber interfaces comprise 4 fiber interfaces.
3. The high-speed optical transceiver module of claim 2, wherein the passive optical element is a multi push on (MPO) connector, the MPO connector having the ferrules and the fiber array at a first end and a mechanical transfer (MT) pin at a second end opposite the first end.
4. The high-speed optical transceiver module of claim 2, wherein the passive optical element is a MPO connector having a tail fiber with an optical connector, the MPO connector comprises a tail sleeve, the tail sleeve comprises the ferrules and the fiber array on a first end and the tail fiber on a second end.
5. The high-speed optical transceiver module of claim 4, wherein the optical connector is one of an arrayed connector, a lucent connector (LC), and a subscriber connector (SC).

6. The high-speed optical transceiver module of claim 2, wherein the passive optical element is a wavelength division multiplexer comprising a multiplexing component and a demultiplexing component, the de-multiplexing component comprises an arrayed waveguide grating (AWG) chip, and an end of the AWG chip is mounted on the photodiode array.

7. The high-speed optical transceiver module of claim 6, wherein an end face of the AWG chip is a slope having a slope angle of 41 to 45 degrees.

\* \* \* \* \*